US012675710B2

(12) United States Patent
Joy et al.

(10) Patent No.: US 12,675,710 B2
(45) Date of Patent: Jul. 7, 2026

(54) SYSTEMS AND METHODS FOR AUTOMATED ALERT PROCESSING

(71) Applicant: JPMORGAN CHASE BANK, N.A., New York, NY (US)

(72) Inventors: Ajumon C. Joy, Bangalore (IN); Devagi Arumugam, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 1160 days.

(21) Appl. No.: 17/205,643

(22) Filed: Mar. 18, 2021

(65) Prior Publication Data
US 2021/0295183 A1 Sep. 23, 2021

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 5/04; G06N 20/00; G06N 20/20
See application file for complete search history.

(56) References Cited

U.S. PATENT DOCUMENTS

| | | | |
|---|---|---|---|
| 2018/0025071 A1* | 1/2018 | Ideses | G06F 16/285 |
| | | | 707/738 |
| 2018/0062909 A1* | 3/2018 | Upshur | G06F 11/0787 |
| 2018/0150758 A1* | 5/2018 | Niininen | H04L 41/147 |
| 2020/0204680 A1* | 6/2020 | Prakash | G06N 20/00 |
| 2020/0293946 A1* | 9/2020 | Sachan | G06N 5/04 |
| 2020/0372415 A1* | 11/2020 | Mann | H04L 41/5074 |
| 2021/0081265 A1* | 3/2021 | Mariyappa | G06F 9/5072 |
| 2021/0194888 A1* | 6/2021 | Bhaskar S | G06F 16/3347 |

* cited by examiner

*Primary Examiner* — Tan H Tran
(74) *Attorney, Agent, or Firm* — GREENBERG TRAURIG LLP

(57) ABSTRACT

Systems and methods for automated alert processing are disclosed. In one embodiment, in an information processing apparatus comprising at least one computer processor, a method for automated alert processing may include: (1) receiving, from a computer system, an alert; (2) classifying the alert as relevant using a relevance classification model, wherein the relevance classification model is a machine-learning trained model; (3) identifying a proposed solution for the alert using a root cause analysis classification model, wherein the root cause analysis classification model is a machine-learning trained model; (4) determining whether the proposed solution was successful; and (5) updating the root cause analysis classification model based on the determination.

12 Claims, 3 Drawing Sheets

SYSTEMS AND METHODS FOR AUTOMATED ALERT PROCESSING

RELATED APPLICATIONS

This application claims priority to, and the benefit of, Indian Patent Application number 202011012224, filed Mar. 20, 2020, the disclosure of which is hereby incorporated, by reference, in its entirety.

BACKGROUND OF THE INVENTION

1. Field of the Invention

The present disclosure relates generally to systems and methods for automated alert processing.

2. Description of the Related Art

Operations and development teams receive a number of alerts throughout the day. This leads to alert saturation-teams receive so many alerts that they miss critical alerts, and spend time on low-priority alerts.

SUMMARY OF THE INVENTION

Systems and methods for automated alert processing are disclosed. In one embodiment, in an information processing apparatus comprising at least one computer processor, a method for automated alert processing may include: (1) receiving, from a computer system, an alert; (2) classifying the alert as relevant using a relevance classification model, wherein the relevance classification model is a machine-learning trained model; (3) identifying a proposed solution for the alert using a root cause analysis classification model, wherein the root cause analysis classification model is a machine-learning trained model; (4) determining whether the proposed solution was successful; and (5) updating the root cause analysis classification model based on the deter-mination.

In one embodiment, the alert may be received as an email, as a service ticket, in an analysis tool log, etc.

In one embodiment, the alert may include an identification of an error condition, a severity indicator, etc. The severity indicator may be used by the relevance classification model in determining relevance of the alert.

In one embodiment, the relevance classification model and/or the root cause analysis classification model may be generated by: pre-processing a training data set; tokenizing the pre-processed training data set; and training the rel-evance classification model and/or the root cause analysis classification model with the tokenized pre-processed train-ing data set.

In one embodiment, the training data set may be pre-processed to remove stop words and special characters.

In one embodiment, the pre-processed training data set may be tokenized using term frequency-inverse document frequency.

In one embodiment, the relevance classification model and/or the root cause analysis classification model may include a decision tree model.

In one embodiment, the relevance classification model and/or the root cause analysis classification model may include a random forest classifier model, a logistic regres-sion model, or a support vector classification model.

In one embodiment, the method may further include self-training the relevance classification model and/or the root cause analysis classification model for a new alert, a new alert format, and/or a new solution.

According to another embodiment, a system for auto-mated alert processing may include: a plurality of computer systems, at least one of the computer systems generating an alert; an electronic device comprising at least one computer processor in communication with the plurality of computer systems that receives the alert from at least one of the computer systems; and a computer program executed by the electronic device. The computer program may classify clas-sifies the alert as relevant using a relevance classification model, wherein the relevance classification model may be a machine-learning trained model; identify a proposed solu-tion for the alert using a root cause analysis classification model, wherein the root cause analysis classification model may be a machine-learning trained model; determine whether the proposed solution was successful; and update the root cause analysis classification model based on the determination.

In one embodiment, the alert may be received as an email, a service ticket, or as an analysis tool log.

In one embodiment, the alert may include an identifica-tion of an error condition, a severity indicator, etc. The severity indicator may be used by the relevance classifica-tion model in determining relevance of the alert.

In one embodiment, the relevance classification model and/or the root cause analysis classification model are gen-erated by: pre-processing a training data set, wherein the training data set may be pre-processed to remove stop words and special characters; tokenizing the pre-processed training data set, wherein the pre-processed training data set may be tokenized using term frequency-inverse document fre-quency; and training the relevance classification model and/or the root cause analysis classification model with the tokenized pre-processed training data set.

In one embodiment, the relevance classification model and/or the root cause analysis classification model may include a decision tree model, a random forest classifier model, a logistic regression model, or a support vector classification model.

In one embodiment, the computer program may self-train the relevance classification model and/or the root cause analysis classification model for a new alert, a new alert format, and/or a new solution.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for automated alert processing. Embodiments may classify rel-evant irrelevant (noise) and relevant (non-noise) alerts received from server logs. If the alert is relevant, the alert may be used to train an artificial intelligence (AI) and/or machine learning (ML) system using an algorithm, and the solution may be rendered.

Examples of error conditions that may trigger an alert include a HTTP 500 error, an account not found error, a 404 not found error, etc. Other examples include communication failures (e.g., between a Site Minder policy server and a webserver), database connection errors (e.g., java.sql.SQL Exception, closed connections, expired passwords, account locked, CPU usage warnings, disk space issues, etc.

If the solution is effective, the ML model may be retained. If the solution is not effective, the ML model may be re-trained.

Figure 1:
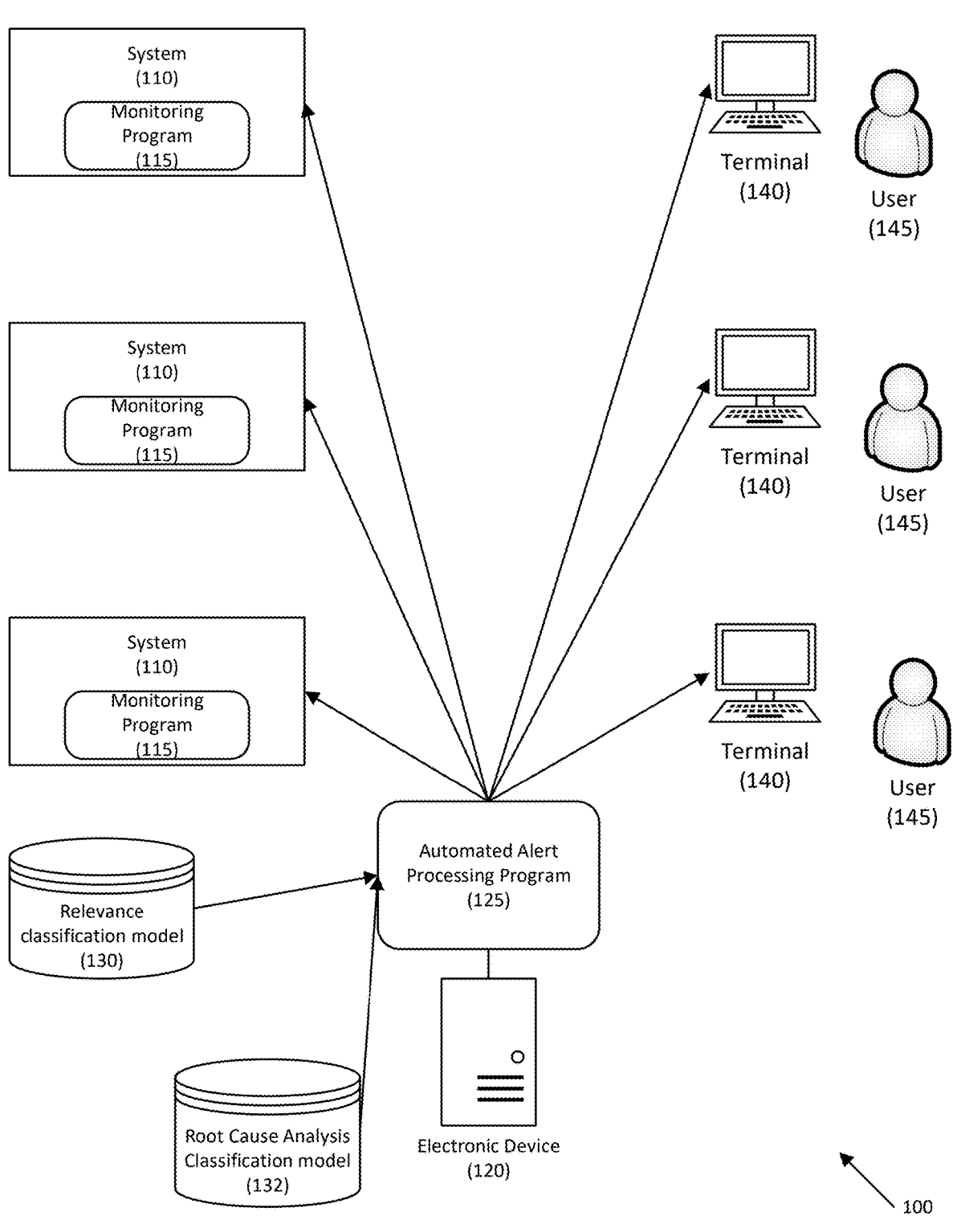
FIG. 1 depicts a system for automated alert processing according to one embodiment.

FIG. 1 depicts a system for automated alert processing according to one embodiment. System 100 may include one or more computer system 110, which may include servers and any other devices that may generate an alert. Examples of alerts include emails, service tickets (e.g., Jira tickets), analysis tool logs (e.g., Splunk logs), etc.

In one embodiment, each computer system 110 may include monitoring program 115. Monitoring program 115 may monitor logs, such as server logs, and may generate alerts as is necessary. The alerts may include an identification of the computer system 110 and log data.

In one embodiment, the alert may further include a severity indicator, such as a severity flag. In one embodiment, the severity indicator may indicate that the condition triggering the alert needs immediate attention. The severity flag may have several levels, such as critical, high, medium, and low. Other numbers and types of severity indicators may be used as is necessary and/or desired. For example, a critical severity indicator may indicate database connectivity errors and communication errors. A high severity indicator may indicate a disk space full error.

Monitoring program 115 may interface with automated alert processing program 125 and may send the alerts in any suitable protocol, such by emails, text message, push message, etc. In one embodiment, automated alert processing program 125 may be executed by electronic device 120, which may be a physical server, a cloud-based server, etc.

Automated alert processing program 125 may communicate with one or more users 145 using terminal(s) 140. In one embodiment, automated alert processing program 125 may communicate notices with solutions to an alert.

Automated alert processing program 125 may further generate relevance classification model 130 and root cause analysis classification model 132. Relevance classification model may classify each incoming alert as relevant or not relevant, and root cause analysis classification model may identify a solution for the alert.

In one embodiment, automated alert processing program 125 (or a similar program) may further automatically implement the identified solution. In one embodiment, automated alert processing program 125 may monitor the implementation of the solution, whether it be a manually applied solution or an automated solution, and may use the results to further train the relevance classification model and/or the root cause analysis classification model.

Figure 2:
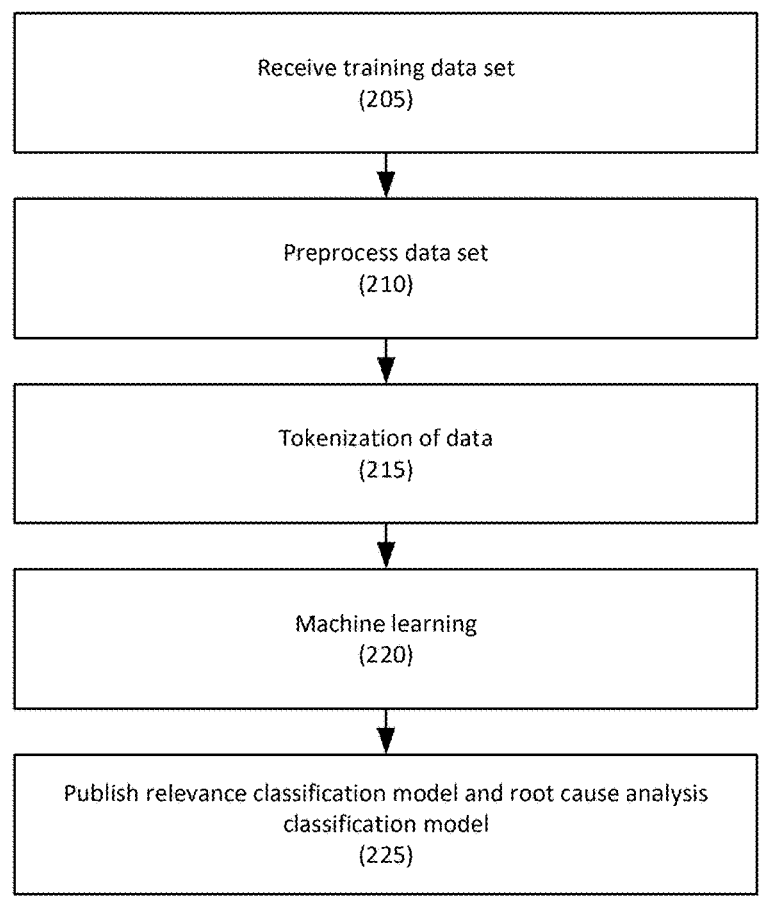
FIG. 2 depicts a method for training an automated alert processing model according to one embodiment.

FIG. 2 depicts a method for training an automated alert processing model according to one embodiment. In step 205, an automated alert processing program may receive training data. The training data may include, for example, historical data including past alerts and solutions (e.g., both successful and unsuccessful) to those alerts. In one embodiment, the training data may further include severity indicators.

In one embodiment, a second dataset may be provided to train a decision tree to determine whether alerts are relevant or not relevant.

In one embodiment, one set of training data may include past alerts, solutions, and relevance information.

In step 210, the automated alert processing program may pre-process the training data. In one embodiment, the training data may be pre-processed to remove stop words, special characters, etc. The result of pre-processing is a more useable dataset for training the classification model.

In step 215, the automated alert processing program may tokenize the training data. For example, the tokenization may convert the training data into a numerical format. In one embodiment, term frequency-inverse document frequency (TF-IDF) may be used to tokenize the training data.

In step 220, the automated alert processing program may use the tokenized data to train one or more machine learning models. In one embodiment, Scikit-library may be used to train the models. Any other suitable training mechanism may be used as is necessary and/or desired.

In step 225, the automated alert processing program may publish the trained models for use.

In one embodiment, the output may be two classification models-a relevance classification model, and a root cause analysis classification model. In one embodiment, the classification models may be trained separately using, for example, separate data. In another embodiment, the classification models may be trained together using the same data. Any suitable matter of training the classification models may be used as is necessary and/or desired.

In one embodiment, one or both of the classification models may include decision tree models. Other decisioning algorithms or models, including a random forest classifier, logistic regression, support vector classification, etc. may be used as is necessary and/or desired. Each algorithm may have a different accuracy level, and the algorithm with the highest accuracy level may be selected.

In one embodiment, one or both of the classification models may be self-trained to accommodate new solutions. For example, one or both of the classification models may receive results of the relevance identification and the identified solution and may use the results to further train the models.

For example, whenever a solution from the root cause analysis classification model does not work for the alert, the user has an option to update the solution. The system may then add the solution to the training dataset and the root cause analysis classification model may be regenerated.

Similarly, the models may be re-trained with working solutions to reinforce the trained solution.

In one embodiment, the relevance classification model may be self-trained to accommodate new alerts, new alert formats, etc.

Figure 3:
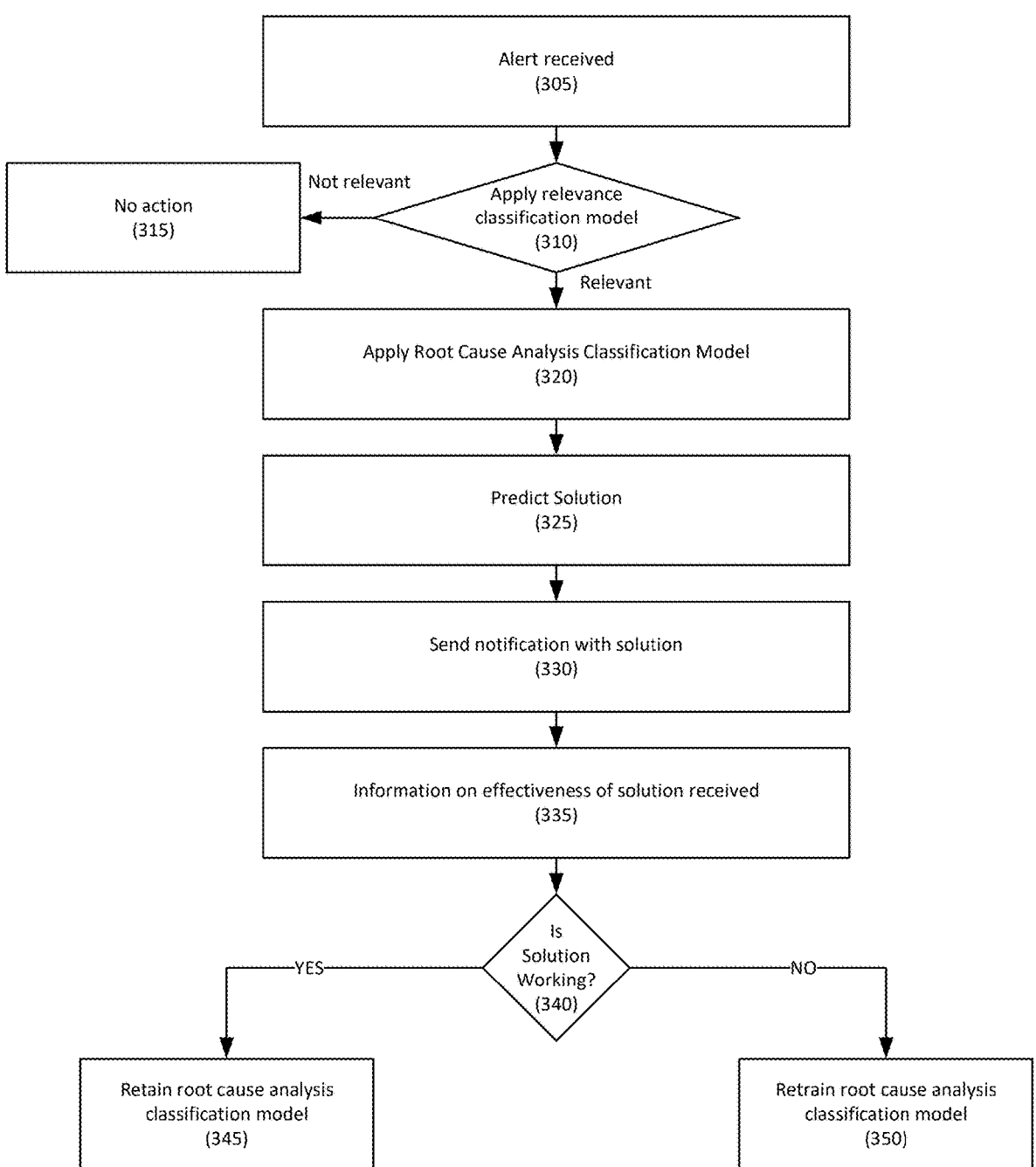
FIG. 3 depicts a method for evaluating an alert received using an automated alert processing model according to one embodiment.

FIG. 3 depicts a method for evaluating an alert received using an automated alert processing model according to one embodiment.

In step 305, an automated alert processing program may receive an alert from a computer system. The alert may be received as an email, a service ticket (e.g., a Jira ticket), an analysis tool logs (e.g., a Splunk log), etc. In one embodiment, the alert may be an automated alert received by email or other suitable messaging channel.

In one embodiment, a monitoring program may provide the alert in response to monitoring, for example, a server log on the computer system.

In one embodiment, an indication of the severity of the alert may be received with the alert. For example, the severity may be received by an API as soon as the alert is received as a severity flag. In one embodiment, the alert may be further classified according to its severity flag.

In one embodiment, based on the severity flag (e.g., critical, high, medium, low), the alert may be classified and sent according to its configuration. For example, critical and high severity alerts may be sent with the solution to different teams than low or medium alerts.

For example, the severity flag may be used with the relevance classification model to classify the alert as relevant or not relevant.

In step 310, the automated alert processing program may provide the alert to a relevance classification model to determine whether the alert is relevant or not relevant. In one embodiment, an algorithm and/or trained model may be used to determine whether the alert is relevant or not.

If the alert is not relevant, in step 315, no action is taken and the alert may be discarded.

If the alert is relevant, in step 320, the alert may be classified using the root cause analysis classification model.

In step 325, the automated alert processing program may use a root cause analysis classification model to output a predicted solution to the alert, and in step 330, the solution may be communicated to interested parties by, for example, email or any other suitable messaging.

In one embodiment, if there is not a solution, the root cause analysis classification model may create an alert, a work ticket, etc. so that a solution may be identified.

In one embodiment, a solution template may be created and sent to a user. Once the solution is identified and the template returned, the model may be re-trained with the solution.

In one embodiment, the automated alert processing program may automatically implement the solution. For example, the automated alert processing program may cause a disk clean-up to run in the background.

In step 335, the automated alert processing program may receive feedback on the relevant classification and/or on the effectiveness of the solution. For example, the monitoring program on the computer system may monitor the computer system (e.g., server logs) to see if an alert classified as not relevant results in a relevant alert. The monitoring program may further monitor the computer system (e.g., server logs), and if there are no further alerts, the solution may be deemed to have resolved the condition that triggered the alert. If an alert is generated, the solution may be deemed to not have resolved the condition that triggered the alert.

In another embodiment, a human may provide feedback as to the effectiveness of the solution. Other types of feedback may be used as is necessary and/or desired.

If, in step 340, the solution is effective, in step 345, the root cause analysis classification model may be retained. In one embodiment, the feedback may be used to retrain the root cause analysis classification model as necessary.

If, in step 340, the solution is not effective, in step 350, the root cause analysis classification model may be retrained. For example, along with the email notification including the solution, the user may be provided with an option to retrain the solution the user will get an option to update the solution if the provided solution is not working. The root cause analysis classification model may then be retrained.

Although multiple embodiments have been disclosed, it should be recognized that these embodiments are not exclusive and features from one may be used with others.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for automated alert processing, comprising: in an information processing apparatus comprising at least one computer processor:

receiving, from a monitoring program executed by a computer system, an alert that identifies the computer system and log data from a log on the computer system, wherein the monitoring program monitors the log and generates the alert based on a condition in the log, wherein the alert includes a severity flag;

classifying the alert as relevant using a relevance classification model as relevant or not relevant based in part on the severity flag, wherein the relevance classification model is a first machine-learning trained model;

pre-processing a training data set for a root cause analysis classification model by removing stop words and special characters;

tokenizing the pre-processed training data set using term frequency-inverse document frequency;

training the root cause analysis classification model with the tokenized pre-processed training data set;

identifying a proposed solution for the alert using the root cause analysis classification model and the classification, wherein the root cause analysis classification model is a second machine-learning trained model;

retraining the relevance classification model based on the proposed solution from the root cause analysis classification model;

automatically executing, by the information processing apparatus, the proposed solution on the computer system to remediate the condition identified in the alert;

monitoring the log to determine if a solution has been implemented, whether the classification of relevant or not relevant resulted in a relevant alert, and to verify remediation of the condition;

determining whether the solution addresses the condition for the alert; and updating the root cause analysis classification model based on the determination.

2. The method of claim 1, wherein the alert is received as an email.

3. The method of claim 1, wherein the alert is received as a service ticket.

4. The method of claim 1, wherein the alert is received in an analysis tool log.

5. The method of claim 1, wherein the alert comprises an identification of an error condition.

6. The method of claim 1, wherein the relevance classification model and the root cause analysis classification model comprises a decision tree model.

7. The method of claim 1, wherein the relevance classification model and the root cause analysis classification model comprises a random forest classifier model, a logistic regression model, or a support vector classification model.

8. The method of claim 1, further comprising:

self-training the relevance classification model and the root cause analysis classification model for a new alert, a new alert format, and a new solution.

9. A system for automated alert processing, comprising:

a plurality of computer systems;

a monitoring program executed on each of the plurality of computer systems, the monitoring program generating an alert from at least one of the computer systems, the alert identifying the at least one computer system and log data from a log on the at least one computer system, wherein the monitoring program monitors the log and generates alerts based on the log, wherein the alert comprises an identification of an error condition and a severity flag;

an electronic device comprising at least one computer processor in communication with the plurality of computer systems that receives the alert from at least one of the computer systems; and a computer program executed by the electronic device; wherein the computer program:

classifies the alert as relevant using a relevance classification model as relevant or not relevant based in part on the severity flag, wherein the relevance classification model is a first machine-learning trained model;

pre-processes a training data set, wherein the training data set is pre-processed to remove stop words and special characters;

tokenizes the pre-processed training data set, wherein the pre-processed training data set is tokenized using term frequency-inverse document frequency; and trains the root cause analysis classification model with the tokenized pre-processed training data set;

identifies a proposed solution for the alert using the root cause analysis classification model, wherein the root cause analysis classification model is a second machine-learning trained model;

retrains the relevance classification model based on the proposed solution from the root cause analysis classification model;

monitoring the log to determine if a solution has been implemented whether the classification of relevant or not relevant resulted in a relevant alert, and to verify remediation of the condition;

automatically executing, by the information processing apparatus, the proposed solution on the computer system to remediate the error condition identified in the alert;

determines whether the proposed solution was successful; and updates the root cause analysis classification model based on the determination.

10. The system of claim 9, wherein the alert is received as an email, a service ticket, or as an analysis tool log.

11. The system of claim 9, wherein the relevance classification model and the root cause analysis classification model comprises a decision tree model, a random forest classifier model, a logistic regression model, or a support vector classification model.

12. The system of claim 9, wherein the computer program further self-trains the relevance classification model and the root cause analysis classification model for a new alert, a new alert format, and a new solution.

* * * * *